United States Patent
Hoshi

(10) Patent No.: US 8,427,015 B2
(45) Date of Patent: Apr. 23, 2013

(54) MULTIHEAD-TYPE CORELESS LINEAR MOTOR

(75) Inventor: Toshiyuki Hoshi, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 305 days.

(21) Appl. No.: 12/854,173

(22) Filed: Aug. 11, 2010

(65) Prior Publication Data
US 2011/0043054 A1     Feb. 24, 2011

(30) Foreign Application Priority Data

Aug. 18, 2009   (JP) ................................. 2009-189574
Feb. 3, 2010    (JP) ................................. 2010-022597

(51) Int. Cl.
*H02K 41/03* (2006.01)

(52) U.S. Cl.
USPC ........................................ 310/12.15; 310/13

(58) Field of Classification Search ............ 310/22, 310/27, 33, 12.01–12.33, 12, 13
See application file for complete search history.

(56) References Cited

U.S. PATENT DOCUMENTS

2004/0212255 A1*   10/2004   Yung-Tsai et al. .............. 310/12

FOREIGN PATENT DOCUMENTS

JP   2001-211630         8/2001
JP   2001211630 A   *   8/2001

OTHER PUBLICATIONS

JP 2001211630 A machine translation on Jun. 30, 2012.*

* cited by examiner

*Primary Examiner* — Tran Nguyen
*Assistant Examiner* — Leda Pham
(74) *Attorney, Agent, or Firm* — Ditthavong Mori & Steiner, P.C.

(57) ABSTRACT

A multihead-type coreless linear motor includes a permanent field magnet having P permanent magnets that are arranged such that different magnetic poles appear alternately, and an armature having M armature coils that are closely wounded and connected in three phases. One of the armature and the permanent field magnet is configured as a moving part and the other is configured as a stator. A plurality of moving parts are arranged on the same stator and are driven separately. In this multihead-type coreless linear motor, the plurality of moving parts includes a large-thrust moving part and a small-thrust moving part that are different in relationship with the stator, the relationship being determined by the number of magnetic poles P of the permanent magnets and the number of armature coils M.

15 Claims, 5 Drawing Sheets

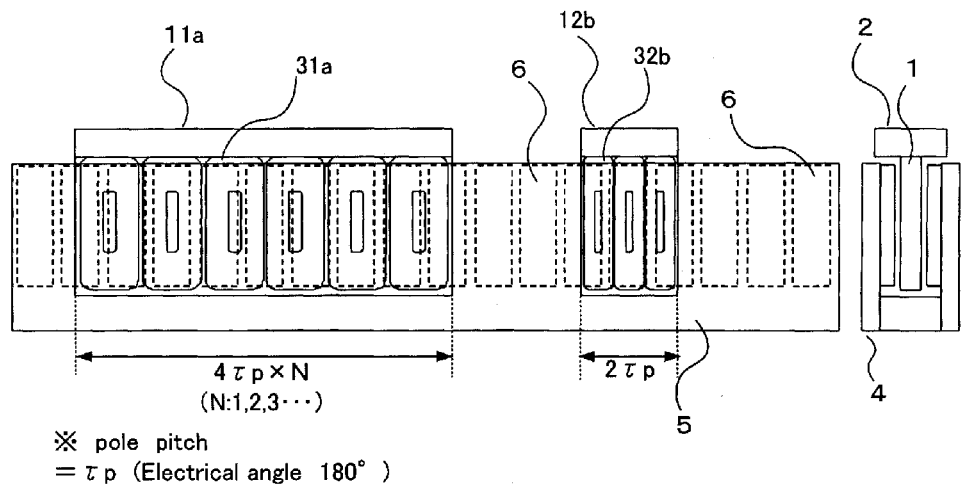
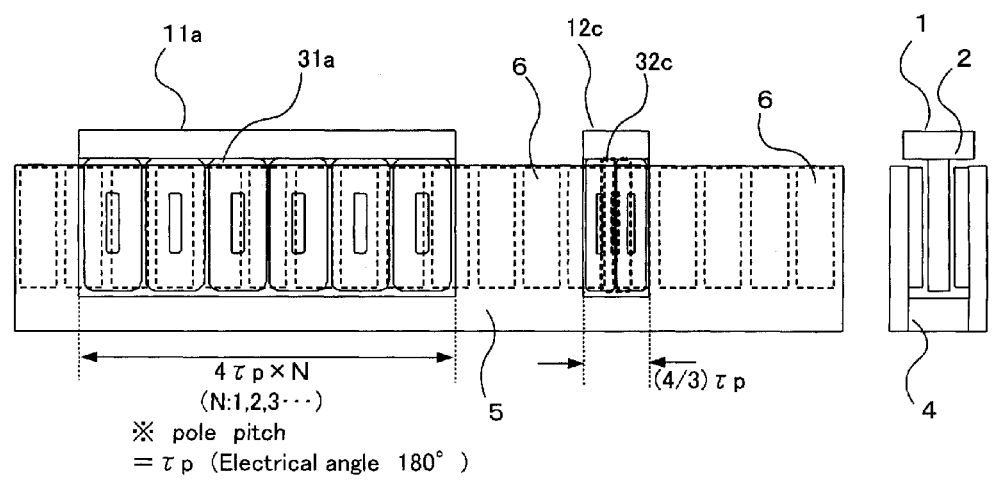
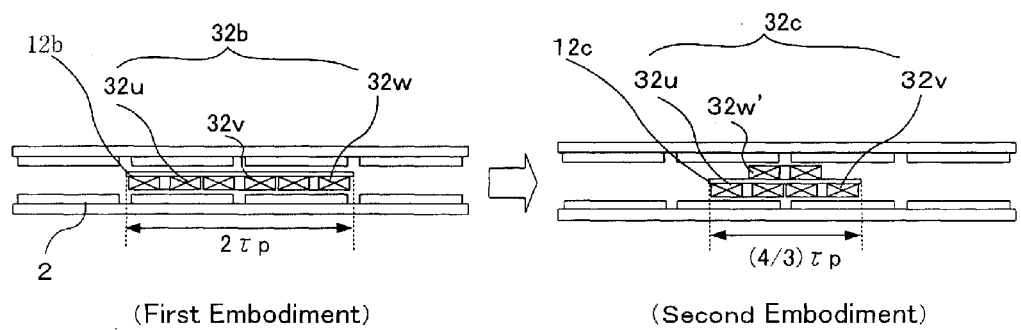

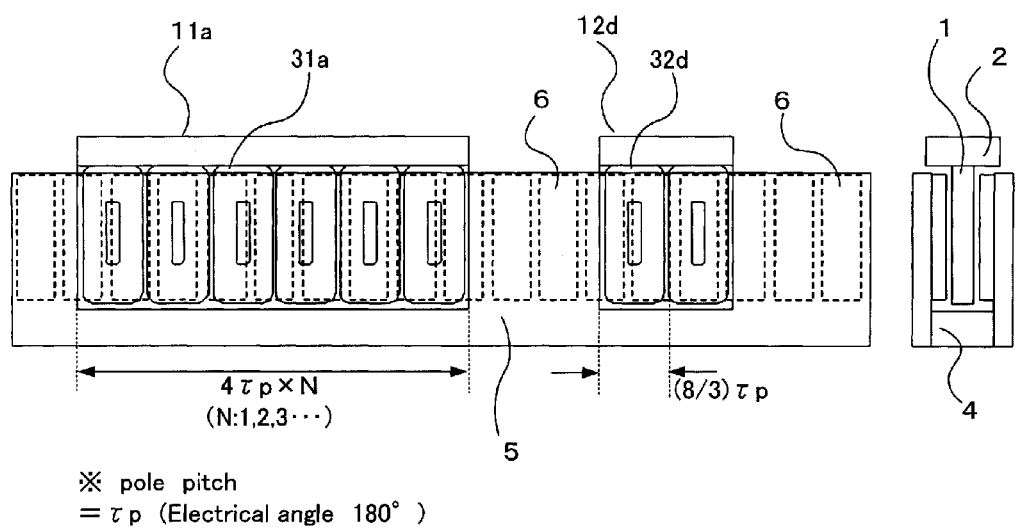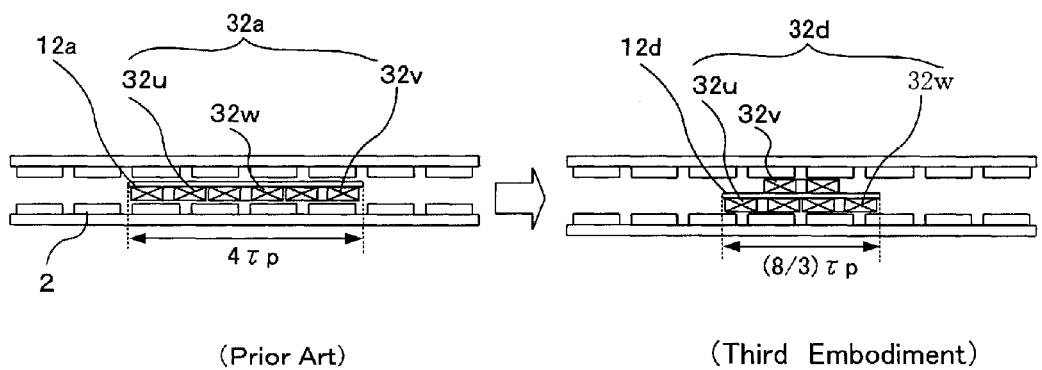

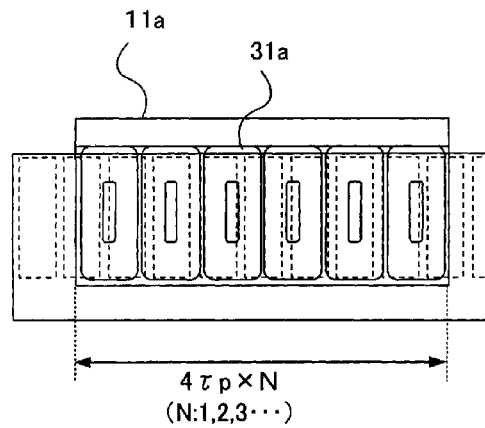 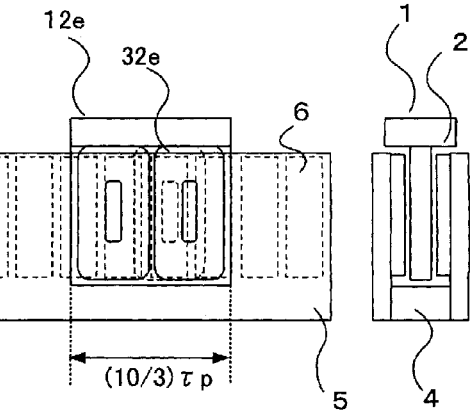
FIG. 6A / FIG. 6B
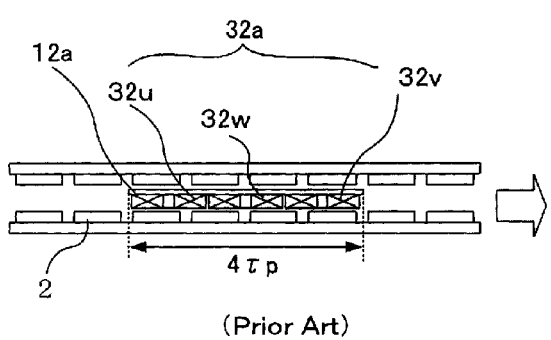 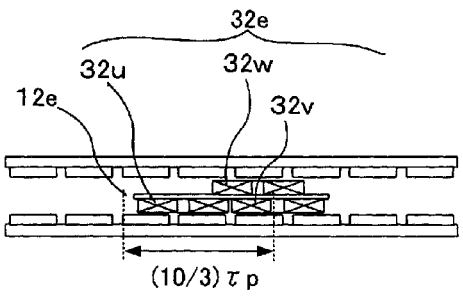
FIG. 7
(Prior Art) → (Fourth Embodiment)
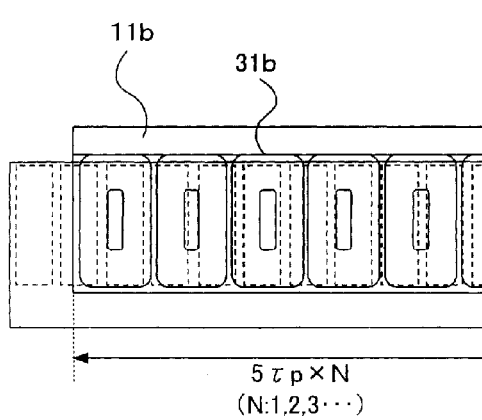 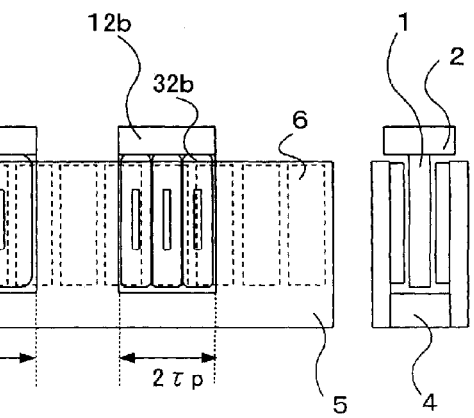
FIG. 8A / FIG. 8B

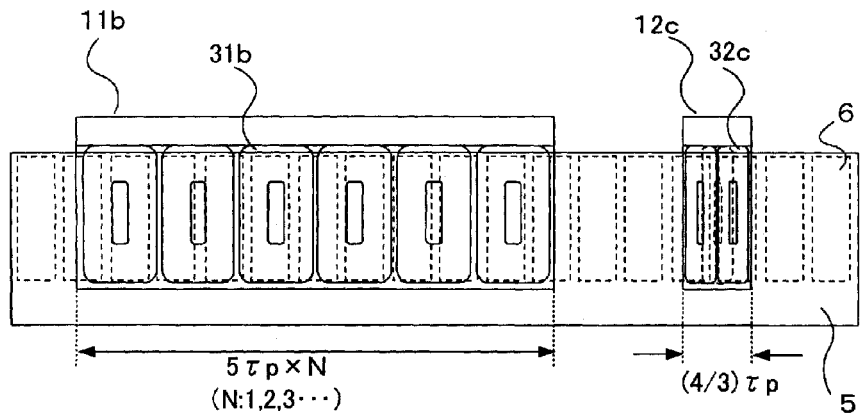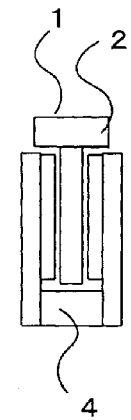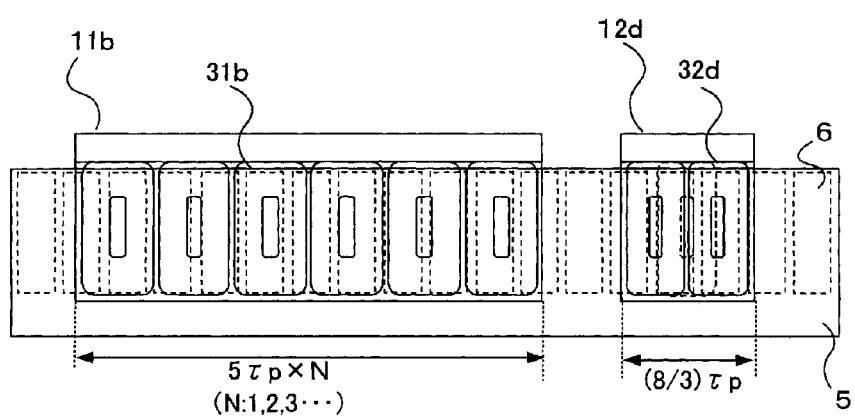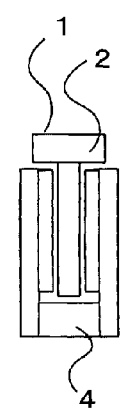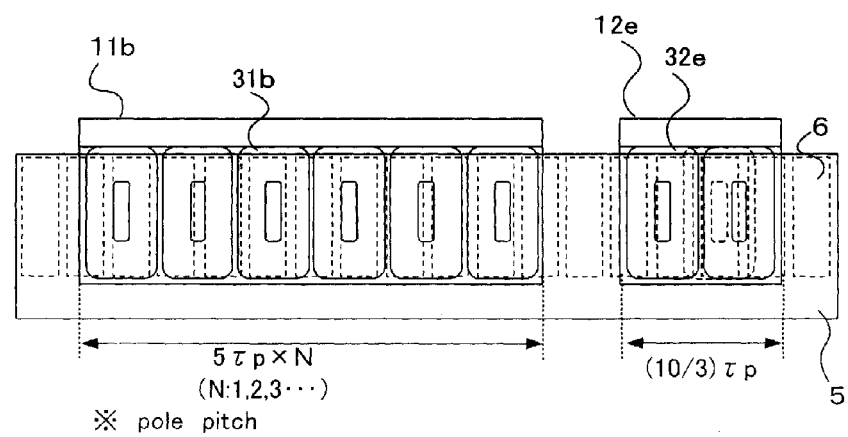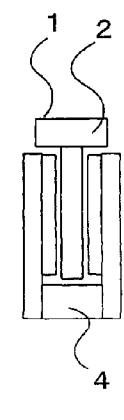

FIG. 12

| | First Embodiment | | Second Embodiment | | Third Embodiment | | Fourth Embodiment | |
|---|---|---|---|---|---|---|---|---|
| | A | B | A | B | A | B | A | B |
| L | $4\tau p$ | $2\tau p$ | $4\tau p$ | $(4/3)\tau p$ | $4\tau p$ | $(8/3)\tau p$ | $4\tau p$ | $(10/3)\tau p$ |
| Cw | 100% | 67% | 100% | 67% | 100% | 100% | 100% | 98% |
| Nw*1 | 100% | 48% | 100% | 48% | 100% | 100% | 100% | 127% |
| V*1 | 100% | 32% | 100% | 32% | 100% | 100% | 100% | 124% |
| Rw*1 | 100% | 44% | 100% | 88% | 100% | 200% | 100% | 263% |
| Cm | 100% | 48% | 100% | 34% | 100% | 71% | 100% | 77% |
| P | 100% | 23% | 100% | 12% | 100% | 50% | 100% | 59% |

| | Fifth Embodiment | | Sixth Embodiment | | Seventh Embodiment | | Eighth Embodiment | |
|---|---|---|---|---|---|---|---|---|
| | A | B | A | B | A | B | A | B |
| L | $5\tau p$ | $2\tau p$ | $5\tau p$ | $(4/3)\tau p$ | $5\tau p$ | $(8/3)\tau p$ | $5\tau p$ | $(10/3)\tau p$ |
| Cw | 100% | 68% | 100% | 68% | 100% | 102% | 100% | 100% |
| Nw*1 | 100% | 38% | 100% | 38% | 100% | 79% | 100% | 100% |
| V*1 | 100% | 26% | 100% | 26% | 100% | 80% | 100% | 100% |
| Rw*1 | 100% | 34% | 100% | 67% | 100% | 152% | 100% | 200% |
| Cm | 100% | 44% | 100% | 31% | 100% | 65% | 100% | 71% |
| P | 100% | 20% | 100% | 10% | 100% | 43% | 100% | 50% |

MULTIHEAD-TYPE CORELESS LINEAR MOTOR

CROSS-REFERENCES TO RELATED APPLICATIONS

The present application claims priority under 35 U.S.C. §119 to Japanese Patent Applications No. 2009-189574 filed Aug. 18, 2009 and No. 2010-022597 filed on Feb. 3, 2010. The contents of the application are incorporated herein by reference in their entirety.

BACKGROUND OF THE INVENTION

1. Field of the Invention

The present invention relates to multihead-type coreless linear motors.

2. Description of the Related Art

Japanese Unexamined Patent Application Publication No. 2001-211630, published Aug. 3, 2001, discloses an example of a coreless linear motor that is used as a feeder mounted on a table of a glass-substrate conveying apparatus, a semiconductor manufacturing apparatus, a machine tool, or the like. This coreless linear motor is of a multihead type where a plurality of moving parts of the same size are arranged on the same stator, so that the plurality of moving parts can be driven separately.

In this multihead-type coreless linear motor, each moving part that constitutes an armature includes a moving part base and a plurality of armature coils that are closely wounded and connected in three phases. The stator that constitutes a field magnet is disposed opposite the armature with a magnetic gap therebetween. The stator includes field yokes and a plurality of permanent magnets that are linearly arranged along the length of the field yokes such that different magnetic poles appear alternately. With this configuration where a plurality of moving parts of the same size are arranged on the same stator, it is possible to move different works placed on the respective moving parts.

A configuration of moving parts for a multihead-type coreless linear motor will be described in detail here. For example, a combination of P=4 and M=3 representing a relationship between the number of magnetic poles P of a permanent field magnet and the number of armature coils M is basically regarded as one set. Then, with a configuration where a small-thrust moving part corresponds to one set and a large-thrust moving part corresponds to two sets and has a length twice that of the small-thrust moving part, the length of each moving part can be determined depending on the necessary thrust for each work. In such a multihead-type coreless linear motor where a combination of the number of magnetic poles and the number of armature coils is regarded as one set or a minimum unit, it is possible to accommodate different works by varying the number of sets for each moving part depending on the necessary thrust for the moving part.

SUMMARY OF THE INVENTION

The present invention has been made in view of the problems described above. An object of the present invention is to provide a multihead-type coreless linear motor that can be minimized in size, even if there is a significant difference in necessary thrust between a plurality of works to be placed on respective moving parts of the linear motor.

According to a first aspect of the present invention, a multihead-type coreless linear motor includes a permanent field magnet having P permanent magnets that are linearly arranged such that different magnetic poles appear alternately; and an armature disposed opposite the permanent field magnet with a magnetic gap therebetween, the armature having M armature coils that are closely wounded and connected in three phases. One of the armature and the permanent field magnet is configured as a moving part and the other is configured as a stator. A plurality of moving parts are arranged on the same stator, and are driven separately relative to the stator. The plurality of moving parts include a large-thrust moving part and a small-thrust moving part that are different in relationship with the stator, the relationship being determined by the number of magnetic poles P of the permanent magnets and the number of armature coils M.

In the multihead-type coreless linear motor according to the present invention, a plurality of moving parts that are different in the relationship between the number of magnetic poles and the number of coils are arranged on the same stator. Therefore, even if there is a significant difference in necessary thrust between a plurality of works, it is possible to reduce the motor size to a minimum and realize a compact apparatus.

BRIEF DESCRIPTION OF THE DRAWINGS

The present invention will be described in further detail with reference to the accompanying drawings wherein:

FIG. 1A is a side view of a multihead-type coreless linear motor according to a first embodiment of the present invention;

FIG. 1B is a front view of FIG. 1A;

FIG. 2A is a side view of a multihead-type coreless linear motor according to a second embodiment of the present invention;

FIG. 2B is a front view of FIG. 2A;

FIG. 3 is an enlarged cross-sectional plan view illustrating how a stator and a small-thrust moving part of FIG. 2A are arranged;

FIG. 4A is a side view of a multihead-type coreless linear motor according to a third embodiment of the present invention;

FIG. 4B is a front view of FIG. 4A;

FIG. 5 is an enlarged cross-sectional plan view illustrating how a stator and a small-thrust moving part of FIG. 4A are arranged;

FIG. 6A is a side view of a multihead-type coreless linear motor according to a fourth embodiment of the present invention;

FIG. 6B is a front view of FIG. 6A;

FIG. 7 is an enlarged cross-sectional plan view illustrating how a stator and a small-thrust moving part of FIG. 6A are arranged;

FIG. 8A is a side view of a multihead-type coreless linear motor according to a fifth embodiment of the present invention;

FIG. 8B is a front view of FIG. 8A;

FIG. 9A is a side view of a multihead-type coreless linear motor according to a sixth embodiment of the present invention;

FIG. 9B is a front view of FIG. 9A;

FIG. 10A is a side view of a multihead-type coreless linear motor according to a seventh embodiment of the present invention;

FIG. 10B is a front view of FIG. 10A;

FIG. 11A is a side view of a multihead-type coreless linear motor according to an eighth embodiment of the present invention;

FIG. 11B is a front view of FIG. 11A; and

FIG. 12 shows a comparison table that compares, for each embodiment, motor characteristics and the levels of necessary thrust calculated on the basis of the motor characteristics, between a large-thrust moving part and a small-thrust moving part on which works are to be placed.

DETAILED DESCRIPTION OF THE EMBODIMENTS

Embodiments of the present invention will now be described with reference to the drawings. Note that identical components are given the same reference numerals and their redundant description will be omitted. Linear motors illustrated in the drawings are configured such that a moving part is an armature and a stator is a field magnet.

First Embodiment

FIG. 1A is a side view of a multihead-type coreless linear motor according to a first embodiment of the present invention. FIG. 1B is a front view of FIG. 1A.

The linear motor illustrated in FIG. 1A includes a large-thrust moving part 11a, a small-thrust moving part 12b, a large-thrust coil 31a, and a small-thrust coil 32b.

The first embodiment is different from the related art in that a plurality of moving parts 1 (i.e., the large-thrust moving part 11a and the small-thrust moving part 12b) that are different in relationship determined by the number of magnetic poles P of a permanent field magnet constituting a stator and the number of armature coils M constituting a moving part are arranged on the same stator 4.

Specifically, in FIG. 1A, the large-thrust moving part 11a corresponds to P:M=4:3 representing a relationship between the number of magnetic poles P of the permanent field magnet and the number of armature coils M. The length of the large-thrust moving part 11a is 4τp×N, where τp is a pole pitch and N is an integer greater than or equal to 1. The small-thrust moving part 12b corresponds to P:M=2:3 representing a relationship between the number of magnetic poles P of the permanent field magnet and the number of armature coils M. The length of the small-thrust moving part 12b is 2τp.

With reference to FIG. 12, a description will be given of a concept of necessary thrust for the large-thrust moving part 11a and the small-thrust moving part 12b having different sizes in the first embodiment.

FIG. 12 shows a comparison table that compares, for each embodiment, motor characteristics and the levels of necessary thrust calculated on the basis of the motor characteristics, between a large-thrust moving part and a small-thrust moving part on which works are to be placed. In the table of FIG. 12, motor characteristics of a large-thrust moving part are taken as 100% in each embodiment. Also, in each embodiment, coils for the large-thrust moving part and the small-thrust moving part have the same conductor diameter, and if the number of coils for each phase is more than one, these coils are connected in parallel. In the table of FIG. 12, a large-thrust moving part is indicated by A, a small-thrust moving part is indicated by B, and a length of a moving part is indicated by L. The motor characteristics include a winding factor indicated by Cw, the number of winding turns indicated by Nw, an inductive voltage indicated by V, a winding resistance indicated by Rw, and a motor constant indicated by Cm. Additionally, a maximum thrust is indicated by P.

Generally, when the size of a work (or load) to be placed on each moving part is different depending on the application of the linear motor, the level of necessary thrust required for each moving part on which the work is to be placed is also different.

Specifically, in the first embodiment, when there is a significant difference between the levels of necessary thrust for works to be placed on the respective large-thrust moving part 11a and small-thrust moving part 12b (see FIG. 1A), a relationship between the number of magnetic poles P of the permanent field magnet and the number of armature coils M for the large-thrust moving part 11a is set to P:M=4:3 and that for the small-thrust moving part 12b is set to P:M=2:3, the large-thrust moving part 11a and the small-thrust moving part 12b being arranged on the same stator 4. At the same time, the length of the large-thrust moving part 11a and that of the small-thrust moving part 12b are set to 4τp×N (where N is an integer greater than or equal to 1) and 2τp, respectively. The two moving parts, the large-thrust moving part 11a and the small-thrust moving part 12b indicated by A and B, respectively, in FIG. 12, are thus different in winding factor (Cw) (the ratio of Cw for A to that for B is 100 to 67) and the number of winding turns (Nw) (the ratio of Nw for A to that for B is 100 to 48) of the armature coils. Therefore, the two moving parts are different in inductive voltage constant (V) (the ratio of thrust constant for A to that for B is 100 to 32). Then, since winding spaces of the armature coils for the two moving parts are different, the two moving parts are different in winding resistance (Rw) (the ratio of Rw for A to that for B is 100 to 44). Moreover, when the two moving parts are different in inductive voltage constant and winding resistance, the two moving parts are also different in motor constant (Cm) (the ratio of Cm for A to that for B is 100 to 48). By calculating the ratio of the levels of thrust for the two moving parts from the duplicate ratio of the motor constants for the two moving parts, the levels of necessary thrust (P) for the two moving parts can be obtained (the ratio of P for A to that for B is 100 to 23). Thus, it is possible to design the linear motor such that the large-thrust moving part 11a and the small-thrust moving part 12b can be adjusted to lengths (or sizes) that are most appropriate for the sizes of works (or loads) to be placed on the respective moving parts (i.e., most appropriate for the difference between the levels of necessary thrust required for the respective moving parts).

As described above, in the first embodiment where a large-thrust moving part and a small-thrust moving part that are different in the relationship between the number of magnetic poles and the number of coils are arranged on the same stator, even if there is a significant difference between the levels of necessary thrust for works to be placed on the respective moving parts, it is possible to reduce the motor size to a minimum.

Second Embodiment

FIG. 2A is a side view of a multihead-type coreless linear motor according to a second embodiment of the present invention. FIG. 2B is a front view of FIG. 2A. FIG. 3 is an enlarged cross-sectional plan view illustrating how a stator and a small-thrust moving part of FIG. 2A are arranged.

The linear motor illustrated in FIG. 2A includes the large-thrust moving part 11a, a small-thrust moving part 12c, the large-thrust coil 31a, and a small-thrust coil 32c. Referring to FIG. 3, the small-thrust coil 32c includes a U-phase coil 32u, a V-phase coil 32v, and a W-phase coil 32w'.

In the second embodiment, as illustrated in FIG. 2A, the large-thrust moving part 11a corresponds to P:M=4:3 representing a relationship between the number of magnetic poles P of the permanent field magnet and the number of armature coils M. The length of the large-thrust moving part 11a is 4τp×N, where τp is a pole pitch and N is an integer greater than or equal to 1. As illustrated in FIG. 2A and FIG. 3, the small-thrust moving part 12c corresponds to P:M=2:3 representing a relationship between the number of magnetic poles P of the permanent field magnet and the number of armature coils M. The W-phase coil 32w' is displaced by an electrical angle of 180° to reverse the winding direction of the W-phase coil 32w', so that the small-thrust moving part 12c has a length of (4/3)τp.

With reference to FIG. 12, a description will be given of a concept of necessary thrust for the large-thrust moving part 11a and the small-thrust moving part 12c having different sizes in the second embodiment.

When there is a significant difference between the levels of necessary thrust for works to be placed on the respective large-thrust moving part 11a and small-thrust moving part 12c (see FIG. 2A and FIG. 3), a relationship between the number of magnetic poles P of the permanent field magnet and the number of armature coils M for the large-thrust moving part 11a is set to P:M=4:3 and that for the small-thrust moving part 12c is set to P:M=2:3, the large-thrust moving part 11a and the small-thrust moving part 12c being arranged on the same stator 4. At the same time, the W-phase coil 32w' for the small-thrust moving part 12c is displaced by an electrical angle of 180°, and the lengths of the large-thrust moving part 11a and the small-thrust moving part 12c are set to 4τp×N (where N is an integer greater than or equal to 1) and (4/3)τp, respectively. The two moving parts, the large-thrust moving part 11a and the small-thrust moving part 12c indicated by A and B, respectively, in FIG. 12, are thus different in winding factor (Cw) (the ratio of Cw for A to that for B is 100 to 67) and the number of winding turns (Nw) (the ratio of Nw for A to that for B is 100 to 48) of the armature coils. Therefore, the two moving parts are different in inductive voltage constant (V) (the ratio of thrust constant for A to that for B is 100 to 32). Then, since winding spaces of the armature coils for the two moving parts are different, the two moving parts are different in winding resistance (Rw) (the ratio of Rw for A to that for B is 100 to 88). Moreover, when the two moving parts are different in inductive voltage constant and winding resistance, the two moving parts are also different in motor constant (Cm) (the ratio of Cm for A to that for B is 100 to 34). By calculating the ratio of the levels of thrust for the two moving parts from the duplicate ratio of the motor constants for the two moving parts, the levels of necessary thrust (P) for the two moving parts can be obtained (the ratio of P for A to that for B is 100 to 12). Thus, it is possible to design the linear motor such that the large-thrust moving part 11a and the small-thrust moving part 12c can be adjusted to lengths (or sizes) that are most appropriate for the sizes of works (or loads) to be placed on the respective moving parts (i.e., most appropriate for the difference between the levels of necessary thrust required for the respective moving parts).

As described above, in the second embodiment where a large-thrust moving part and a small-thrust moving part that are different in the relationship between the number of magnetic poles and the number of coils are arranged on the same stator, even if there is a significant difference between the levels of necessary thrust for works to be placed on the respective moving parts, it is possible to reduce the motor size to a minimum.

Third Embodiment

FIG. 4A is a side view of a multihead-type coreless linear motor according to a third embodiment of the present invention. FIG. 4B is a front view of FIG. 4A. FIG. 5 is an enlarged cross-sectional plan view illustrating how a stator and a small-thrust moving part of FIG. 4A are arranged.

The linear motor illustrated in FIG. 4A includes the large-thrust moving part 11a, a small-thrust moving part 12d, the large-thrust coil 31a, and a small-thrust coil 32d. Referring to FIG. 5, the small-thrust coil 32d includes the U-phase coil 32u, the V-phase coil 32v, and a W-phase coil 32w.

In the third embodiment, as illustrated in FIG. 4A and FIG. 5, the large-thrust moving part 11a and the small-thrust moving part 12d both correspond to P:M=4:3 representing a relationship between the number of magnetic poles P of the permanent field magnet and the number of armature coils M. The length of the large-thrust moving part 11a is 4τp×N, where τp is a pole pitch and N is an integer greater than or equal to 1. As for the small-thrust moving part 12d, the V-phase coil 32v is displaced by an electrical angle of 360°, so that the small-thrust moving part 12d has a length of (8/3)τp.

With reference to FIG. 12, a description will be given of a concept of necessary thrust for the large-thrust moving part 11a and the small-thrust moving part 12d having different sizes in the third embodiment.

When there is a significant difference between the levels of necessary thrust for works to be placed on the respective large-thrust moving part 11a and small-thrust moving part 12d (see FIG. 4A and FIG. 5), a relationship between the number of magnetic poles P of the permanent field magnet and the number of armature coils M for both the large-thrust moving part 11a and the small-thrust moving part 12d arranged on the same stator 4 is set to P:M=4:3. At the same time, the V-phase coil 32v for the small-thrust moving part 12d is displaced by an electrical angle of 360°, and the lengths of the large-thrust moving part 11a and the small-thrust moving part 12d are set to 4τp×N (where N is an integer greater than or equal to 1) and (8/3)τp, respectively. Since the two moving parts, the large-thrust moving part 11a and the small-thrust moving part 12d indicated by A and B, respectively, in FIG. 12, are the same in winding factor (Cw) and the number of winding turns (Nw) of the armature coils, there is no difference in inductive voltage constant (V) between the two moving parts. However, since winding spaces of the armature coils for the two moving parts are different, the two moving parts are different in winding resistance (Rw) (the ratio of Rw for A to that for B is 100 to 200). Moreover, when the two moving parts are different in winding resistance, the two moving parts are also different in motor constant (Cm) (the ratio of Cm for A to that for B is 100 to 71). By calculating the ratio of the levels of thrust for the two moving parts from the duplicate ratio of the motor constants for the two moving parts, the levels of necessary thrust (P) for the two moving parts can be obtained (the ratio of P for A to that for B is 100 to 50). Thus, it is possible to design the linear motor such that the large-thrust moving part 11a and the small-thrust moving part 12d can be adjusted to lengths (or sizes) that are most appropriate for the sizes of works (or loads) to be placed on the respective moving parts (i.e., most appropriate for the difference between the levels of necessary thrust required for the respective moving parts).

As described above, in the third embodiment where a large-thrust moving part and a small-thrust moving part that correspond to the same relationship between the number of magnetic poles and the number of coils are arranged on the same stator, even if there is a significant difference between the levels of necessary thrust for works to be placed on the respective moving parts, it is possible to reduce the motor size to a minimum.

Fourth Embodiment

FIG. 6A is a side view of a multihead-type coreless linear motor according to a fourth embodiment of the present invention. FIG. 6B is a front view of FIG. 6A. FIG. 7 is an enlarged cross-sectional plan view illustrating how a stator and a small-thrust moving part of FIG. 6A are arranged.

The linear motor illustrated in FIG. 6A includes the large-thrust moving part 11a, a small-thrust moving part 12e, the large-thrust coil 31a, and a small-thrust coil 32e. Referring to FIG. 7, the small-thrust coil 32e includes the U-phase coil 32u, the V-phase coil 32v, and the W-phase coil 32w.

In the fourth embodiment, as illustrated in FIG. 6A, the large-thrust moving part 11a corresponds to P:M=4:3 representing a relationship between the number of magnetic poles P of the permanent field magnet and the number of armature coils M. The length of the large-thrust moving part 11a is 4τp×N, where τp is a pole pitch and N is an integer greater than or equal to 1. As illustrated in FIG. 6A and FIG. 7, the small-thrust moving part 12e corresponds to P:M=5:3 representing a relationship between the number of magnetic poles P of the permanent field magnet and the number of armature coils M. The W-phase coil 32w is displaced by an electrical angle of 360°, so that the small-thrust moving part 12e has a length of (10/3)τp.

With reference to FIG. 12, a description will be given of a concept of necessary thrust for the large-thrust moving part 11a and the small-thrust moving part 12e having different sizes in the fourth embodiment.

When there is a significant difference between the levels of necessary thrust for works to be placed on the respective large-thrust moving part 11a and small-thrust moving part 12e (see FIG. 6A and FIG. 7), a relationship between the number of magnetic poles P of the permanent field magnet and the number of armature coils M for the large-thrust moving part 11a is set to P:M=4:3 and that for the small-thrust moving part 12e is set to P:M=5:3, the large-thrust moving part 11a and the small-thrust moving part 12e being arranged on the same stator 4. At the same time, the W-phase coil 32w for the small-thrust moving part 12e is displaced by an electrical angle of 360°, and the lengths of the large-thrust moving part 11a and the small-thrust moving part 12e are set to 4τp×N (where N is an integer greater than or equal to 1) and (10/3)τp, respectively. The two moving parts, the large-thrust moving part 11a and the small-thrust moving part 12e indicated by A and B, respectively, in FIG. 12, are thus different in winding factor (Cw) (the ratio of Cw for A to that for B is 100 to 98) and the number of winding turns (Nw) (the ratio of Nw for A to that for B is 100 to 127) of the armature coils. Therefore, the two moving parts are different in inductive voltage constant (V) (the ratio of thrust constant for A to that for B is 100 to 124). Then, since winding spaces of the armature coils for the two moving parts are different, the two moving parts are different in winding resistance (Rw) (the ratio of Rw for A to that for B is 100 to 263). Moreover, when the two moving parts are different in inductive voltage constant and winding resistance, the two moving parts are also different in motor constant (Cm) (the ratio of Cm for A to that for B is 100 to 77). By calculating the ratio of the levels of thrust for the two moving parts from the duplicate ratio of the motor constants for the two moving parts, the levels of necessary thrust (P) for the two moving parts can be obtained (the ratio of P for A to that for B is 100 to 59). Thus, it is possible to design the linear motor such that the large-thrust moving part 11a and the small-thrust moving part 12e can be adjusted to lengths (or sizes) that are most appropriate for the sizes of works (or loads) to be placed on the respective moving parts (i.e., most appropriate for the difference between the levels of necessary thrust required for the respective moving parts).

As described above, in the fourth embodiment where a large-thrust moving part and a small-thrust moving part that are different in the relationship between the number of magnetic poles and the number of coils are arranged on the same stator, even if there is a significant difference between the levels of necessary thrust for works to be placed on the respective moving parts, it is possible to reduce the motor size to a minimum.

Fifth Embodiment

FIG. 8A is a side view of a multihead-type coreless linear motor according to a fifth embodiment of the present invention. FIG. 8B is a front view of FIG. 8A.

The linear motor illustrated in FIG. 8A includes a large-thrust moving part 11b, the small-thrust moving part 12b, a large-thrust coil 31b, and the small-thrust coil 32b.

In the fifth embodiment, as illustrated in FIG. 8A, the large-thrust moving part 11b corresponds to P:M=5:3 representing a relationship between the number of magnetic poles P of the permanent field magnet and the number of armature coils M. The length of the large-thrust moving part 11b is 5τp×N, where τp is a pole pitch and N is an integer greater than or equal to 1. The small-thrust moving part 12b corresponds to P:M=2:3 representing a relationship between the number of magnetic poles P of the permanent field magnet and the number of armature coils M. The length of the small-thrust moving part 12b is 2τp.

With reference to FIG. 12, a description will be given of a concept of necessary thrust for the large-thrust moving part 11b and the small-thrust moving part 12b having different sizes in the fifth embodiment.

When there is a significant difference between the levels of necessary thrust for works to be placed on the respective large-thrust moving part 11b and small-thrust moving part 12b (see FIG. 8A), a relationship between the number of magnetic poles P of the permanent field magnet and the number of armature coils M for the large-thrust moving part 11b is set to P:M=5:3 and that for the small-thrust moving part 12b is set to P:M=2:3, the large-thrust moving part 11b and the small-thrust moving part 12b being arranged on the same stator 4. At the same time, the lengths of the large-thrust moving part 11b and the small-thrust moving part 12b are set to 5τp×N (where N is an integer greater than or equal to 1) and 2τp, respectively. The two moving parts, the large-thrust moving part 11b and the small-thrust moving part 12b indicated by A and B, respectively, in FIG. 12, are thus different in winding factor (Cw) (the ratio Cw for A to that for B is 100 to 68) and the number of winding turns (Nw) (the ratio of Nw for A to that for B is 100 to 38) of the armature coils. Therefore, the two moving parts are different in inductive voltage constant (V) (the ratio of thrust constant for A to that for B is 100 to 26). Then, since winding spaces of the armature coils for the two moving parts are different, the two moving parts are different in winding resistance (Rw) (the ratio of Rw for A to that for B is 100 to 34). Moreover, when the two moving parts are different in inductive voltage constant and winding resistance, the two moving parts are also different in motor constant (Cm) (the ratio of Cm for A to that for B is 100 to 44). By calculating the ratio of the levels of thrust for the two moving parts from the duplicate ratio of the motor constants for the two moving parts, the levels of necessary thrust (P) for the two moving parts can be obtained (the ratio of P for A to that for B is 100 to 20). Thus, it is possible to design the linear motor such that the large-thrust moving part 11b and the small-thrust moving part 12b can be adjusted to lengths (or sizes) that are most appropriate for the sizes of works (or loads) to be placed on the respective moving parts (i.e., most appropriate for the difference between the levels of necessary thrust required for the respective moving parts).

As described above, in the fifth embodiment where a large-thrust moving part and a small-thrust moving part that are different in the relationship between the number of magnetic poles and the number of coils are arranged on the same stator, even if there is a significant difference between the levels of necessary thrust for works to be placed on the respective moving parts, it is possible to reduce the motor size to a minimum.

Sixth Embodiment

FIG. 9A is a side view of a multihead-type coreless linear motor according to a sixth embodiment of the present invention. FIG. 9B is a front view of FIG. 9A. Note that how a stator and a small-thrust moving part of FIG. 9A are arranged is illustrated in FIG. 3.

The linear motor illustrated in FIG. 9A includes the large-thrust moving part 11b, the small-thrust moving part 12c, the large-thrust coil 31b, and the small-thrust coil 32c.

In the sixth embodiment, as illustrated in FIG. 9A, the large-thrust moving part 11b corresponds to P:M=5:3 representing a relationship between the number of magnetic poles P of the permanent field magnet and the number of armature coils M. The length of the large-thrust moving part 11b is 5τp×N, where τp is a pole pitch and N is an integer greater than or equal to 1. As illustrated in FIG. 9A and FIG. 3, the small-thrust moving part 12c corresponds to P:M=2:3 representing a relationship between the number of magnetic poles P of the permanent field magnet and the number of armature coils M. The W-phase coil 32w' is displaced by an electrical angle of 180° to reverse the winding direction of the W-phase coil 32w', so that the small-thrust moving part 12c has a length of (4/3)τp.

With reference to FIG. 12, a description will be given of a concept of necessary thrust for the large-thrust moving part 11b and the small-thrust moving part 12c having different sizes in the sixth embodiment.

When there is a significant difference between the levels of necessary thrust for works to be placed on the respective large-thrust moving part 11b and small-thrust moving part 12c (see FIG. 9A and FIG. 3), a relationship between the number of magnetic poles P of the permanent field magnet and the number of armature coils M for the large-thrust moving part 11b is set to P:M=5:3 and that for the small-thrust moving part 12c is set to P:M=2:3, the large-thrust moving part 11b and the small-thrust moving part 12c being arranged on the same stator 4. At the same time, the W-phase coil 32w' for the small-thrust moving part 12c is displaced by an electrical angle of 180°, and the lengths of the large-thrust moving part 11b and the small-thrust moving part 12c are set to 5τp×N (where N is an integer greater than or equal to 1) and (4/3)τp, respectively. The two moving parts, the large-thrust moving part 11b and the small-thrust moving part 12c indicated by A and B, respectively, in FIG. 12, are thus different in winding factor (Cw) (the ratio of Cw for A to that for B is 100 to 68) and the number of winding turns (Nw) (the ratio of Nw for A to that for B is 100 to 38) of the armature coils. Therefore, the two moving parts are different in inductive voltage constant (V) (the ratio of thrust constant for A to that for B is 100 to 26). Then, since winding spaces of the armature coils for the two moving parts are different, the two moving parts are different in winding resistance (Rw) (the ratio Rw for A to that for B is 100 to 67). Moreover, when the two moving parts are different in inductive voltage constant and winding resistance, the two moving parts are also different in motor constant (Cm) (the ratio of Cm for A to that for B is 100 to 31). By calculating the ratio of the levels of thrust for the two moving parts from the duplicate ratio of the motor constants for the two moving parts, the levels of necessary thrust (P) for the two moving parts can be obtained (the ratio of P for A to that for B is 100 to 10). Thus, it is possible to design the linear motor such that the large-thrust moving part 11b and the small-thrust moving part 12c can be adjusted to lengths (or sizes) that are most appropriate for the sizes of works (or loads) to be placed on the respective moving parts (i.e., most appropriate for the difference between the levels of necessary thrust required for the respective moving parts).

As described above, in the sixth embodiment where a large-thrust moving part and a small-thrust moving part that are different in the relationship between the number of magnetic poles and the number of coils are arranged on the same stator, even if there is a significant difference between the levels of necessary thrust for works to be placed on the respective moving parts, it is possible to reduce the motor size to a minimum.

Seventh Embodiment

FIG. 10A is a side view of a multihead-type coreless linear motor according to a seventh embodiment of the present invention. FIG. 10B is a front view of FIG. 10A. Note that how a stator and a small-thrust moving part of FIG. 10A are arranged is illustrated in FIG. 5.

The linear motor illustrated in FIG. 10A includes the large-thrust moving part 11b, the small-thrust moving part 12d, the large-thrust coil 31b, and the small-thrust coil 32d.

In the seventh embodiment, as illustrated in FIG. 10A, the large-thrust moving part 11b corresponds to P:M=5:3 representing a relationship between the number of magnetic poles P of the permanent field magnet and the number of armature coils M. The length of the large-thrust moving part 11b is 5τp×N, where τp is a pole pitch and N is an integer greater than or equal to 1. As illustrated in FIG. 10A and FIG. 5, the small-thrust moving part 12d corresponds to P:M=4:3 representing a relationship between the number of magnetic poles P of the permanent field magnet and the number of armature coils M. The V-phase coil 32v is displaced by an electrical angle of 360°, so that the small-thrust moving part 12d has a length of (8/3)τp.

With reference to FIG. 12, a description will be given of a concept of necessary thrust for the large-thrust moving part 11b and the small-thrust moving part 12d having different sizes in the seventh embodiment.

When there is a significant difference between the levels of necessary thrust for works to be placed on the respective large-thrust moving part 11b and small-thrust moving part 12d (see FIG. 10A and FIG. 5), a relationship between the number of magnetic poles P of the permanent field magnet and the number of armature coils M for the large-thrust moving part 11b is set to P:M=5:3 and that for the small-thrust moving part 12d is set to P:M=2:3, the large-thrust moving part 11b and the small-thrust moving part 12d being arranged on the same stator 4. At the same time, the V-phase coil 32v for the small-thrust moving part 12d is displaced by an electrical angle of 360°, and the lengths of the large-thrust moving part 11b and the small-thrust moving part 12d are set to 5τp×N (where N is an integer greater than or equal to 1) and (8/3)τp, respectively. The two moving parts, the large-thrust moving part 11b and the small-thrust moving part 12d indicated by A and B, respectively, in FIG. 12, are thus different in winding factor (Cw) (the ratio of Cw for A to that for B is 100 to 102) and the number of winding turns (Nw) (the ratio of Nw for A to that for B is 100 to 79) of the armature coils. Therefore, the two moving parts are different in inductive voltage constant (V) (the ratio of thrust constant for A to that for B is 100 to 80). Then, since winding spaces of the armature coils for the two moving parts are different, the two moving parts are different in winding resistance (Rw) (the ratio of Rw for A to that for B is 100 to 152). Moreover, when the two moving parts are different in inductive voltage constant and winding resistance, the two moving parts are also different in motor constant (Cm) (the ratio of Cm for A to that for B is 100 to 65). By calculating the ratio of the levels of thrust for the two moving parts from the duplicate ratio of the motor constants for the two moving parts, the levels of necessary thrust (P) for the two moving parts can be obtained (the ratio of P for A to that for B is 100 to 43). Thus, it is possible to design the linear motor such that the large-thrust moving part 11b and the small-thrust moving part 12d can be adjusted to lengths (or sizes) that are most appropriate for the sizes of works (or loads) to be placed on the respective moving parts (i.e., most appropriate for the difference between the levels of necessary thrust required for the respective moving parts).

As described above, in the seventh embodiment where a large-thrust moving part and a small-thrust moving part that are different in the relationship between the number of magnetic poles and the number of coils are arranged on the same stator, even if there is a significant difference between the levels of necessary thrust for works to be placed on the respective moving parts, it is possible to reduce the motor size to a minimum.

Eighth Embodiment

FIG. 11A is a side view of a multihead-type coreless linear motor according to an eighth embodiment of the present invention. FIG. 11B is a front view of FIG. 11A. Note that how a stator and a small-thrust moving part of FIG. 11A are arranged is illustrated in FIG. 7.

The linear motor illustrated in FIG. 11A includes the large-thrust moving part 11b, the small-thrust moving part 12e, the large-thrust coil 31b, and the small-thrust coil 32e.

In the eighth embodiment, as illustrated in FIG. 11A and FIG. 7, the large-thrust moving part 11b and the small-thrust moving part 12e both correspond to P:M=5:3 representing a relationship between the number of magnetic poles P of the permanent field magnet and the number of armature coils M. The length of the large-thrust moving part 11b is $5\tau p \times N$, where $\tau p$ is a pole pitch and N is an integer greater than or equal to 1. As for the small-thrust moving part 12e, the W-phase coil 32w is displaced by an electrical angle of 360°, so that the small-thrust moving part 12e has a length of $(10/3)\tau p$.

With reference to FIG. 12, a description will be given of a concept of necessary thrust for the large-thrust moving part 11b and the small-thrust moving part 12e having different sizes in the eighth embodiment.

When there is a significant difference between the levels of necessary thrust for works to be placed on the respective large-thrust moving part 11b and small-thrust moving part 12e (see FIG. 11A and FIG. 7), a relationship between the number of magnetic poles P of the permanent field magnet and the number of armature coils M for both the large-thrust moving part 11b and the small-thrust moving part 12e arranged on the same stator 4 is set to P:M=5:3. At the same time, the W-phase coil 32w for the small-thrust moving part 12e is displaced by an electrical angle of 360°, and the lengths of the large-thrust moving part 11b and the small-thrust moving part 12e are set to $5\tau p \times N$ (where N is an integer greater than or equal to 1) and $(10/3)\tau p$, respectively. Since the two moving parts, the large-thrust moving part 11b and the small-thrust moving part 12e indicated by A and B, respectively, in FIG. 12, are the same in winding factor (Cw) and the number of winding turns (Nw) of the armature coils, there is no difference in inductive voltage constant (V) between the two moving parts. However, since winding spaces of the armature coils for the two moving parts are different, the two moving parts are different in winding resistance (Rw) (the ratio of Rw for A to that for B is 100 to 200). Moreover, when the two moving parts are different in winding resistance, the two moving parts are also different in motor constant (Cm) (the ratio of Cm for A to that for B is 100 to 71). By calculating the ratio of the levels of thrust for the two moving parts from the duplicate ratio of the motor constants for the two moving parts, the levels of necessary thrust (P) for the two moving parts can be obtained (the ratio of P for A to that for B is 100 to 50). Thus, it is possible to design the linear motor such that the large-thrust moving part 11b and the small-thrust moving part 12e can be adjusted to lengths (or sizes) that are most appropriate for the sizes of works (or loads) to be placed on the respective moving parts (i.e., most appropriate for the difference between the levels of necessary thrust required for the respective moving parts).

As described above, in the eighth embodiment where a large-thrust moving part and a small-thrust moving part that correspond to the same relationship between the number of magnetic poles and the number of coils are arranged on the same stator, even if there is a significant difference between the levels of necessary thrust for works to be placed on the respective moving parts, it is possible to reduce the motor size to a minimum.

An armature and a field magnet are configured as a moving part and a stator, respectively, in the embodiments described above. However, an armature and a field magnet may be configured as a stator and a moving part, respectively.

What is claimed is:
1. A multihead-type coreless linear motor comprising:
   a stator including a permanent field magnet having permanent magnets linearly arranged in a first direction such that different magnetic poles appear alternately;
   a first moving part movable with respect to the stator in the first direction and including a first armature facing the permanent field magnet with a magnetic gap therebetween, the first armature having M1 first armature coils connected in three phases; and
   a second moving part movable with respect to the stator in the first direction and including a second armature facing the permanent field magnet with a magnetic gap therebetween, the second armature having M2 second armature coils connected in three phases, the first and second moving parts being relatively movable with respect to each other in the first direction, the first armature being provided to face P1 permanent magnets of the permanent field magnet, the second armature being provided to face P2 permanent magnets of the permanent field magnet, a ratio of P1 to M1 being different from a ratio of P2 to M2.
2. A multihead-type coreless linear motor comprising:
   a permanent field magnet having P permanent magnets that are linearly arranged such that different magnetic poles appear alternately; and an armature disposed opposite the permanent field magnet with a magnetic gap therebetween, the armature having M armature coils that are closely wounded and connected in three phases, wherein one of the armature and the permanent field magnet is configured as a moving part and the other is configured as a stator, a plurality of moving parts are arranged on the same stator, and the plurality of moving parts are driven separately relative to the stator, wherein the plurality of moving parts include a large-thrust moving part and a small-thrust moving part that are different in relationship with the stator, the relationship being determined by the number of magnetic poles P of the permanent magnets and the number of armature coils M.

wherein a relationship between the number of magnetic poles P of the permanent magnets and the number of armature coils M is set to P:M=4:3 for the large-thrust moving part, and a length of the large-thrust moving part is set to $4\tau p \times N$, where $\tau p$ is a pole pitch and N is an integer greater than or equal to 1, and wherein a relationship between the number of magnetic poles P of the permanent magnets and the number of armature coils M is set to P:M=2:3 for the small-thrust moving part, and a length of the small-thrust moving part is set to $2\tau p$.

3. A multihead-type coreless linear motor comprising:

a permanent field magnet having P permanent magnets that are linearly arranged such that different magnetic poles appear alternately; and an armature disposed opposite the permanent field magnet with a magnetic gap therebetween, the armature having M armature coils that are closely wounded and connected in three phases, wherein one of the armature and the permanent field magnet is configured as a moving part and the other is configured as a stator, a plurality of moving parts are arranged on the same stator, and the plurality of moving parts are driven separately relative to the stator, wherein the plurality of moving parts include a large-thrust moving part and a small-thrust moving part that are different in relationship with the stator, the relationship being determined by the number of magnetic poles P of the permanent magnets and the number of armature coils M, wherein a relationship between the number of magnetic poles P of the permanent magnets and the number of armature coils M is set to P:M=4:3 for the large-thrust moving part, and a length of the large-thrust moving part is set to $4\tau p \times N$, where $\tau p$ is a pole pitch and N is an integer greater than or equal to 1, and wherein a relationship between the number of magnetic poles P of the permanent magnets and the number of armature coils M is set to P:M=2:3 for the small-thrust moving part, and a length of the small-thrust moving part is set to $(4/3)\tau p$ by displacing a W-phase coil of the armature coils provided on the small-thrust moving part or on the stator by an electrical angle of 180° to reverse the winding direction of the W-phase coil.

4. A multihead-type coreless linear motor comprising:

a permanent field magnet having P permanent magnets that are linearly arranged such that different magnetic poles appear alternately; and an armature disposed opposite the permanent field magnet with a magnetic gap therebetween, the armature having M armature coils that are closely wounded and connected in three phases, wherein one of the armature and the permanent field magnet is configured as a moving part and the other is configured as a stator, a plurality of moving parts are arranged on the same stator, and the plurality of moving parts are driven separately relative to the stator, wherein the plurality of moving parts include a large-thrust moving part and a small-thrust moving part that are different in relationship with the stator, the relationship being determined by the number of magnetic poles P of the permanent magnets and the number of armature coils M, wherein a relationship between the number of magnetic poles P of the permanent magnets and the number of armature coils M is set to P:M=4:3 for the large-thrust moving part, and a length of the large-thrust moving part is set to $4\tau p \times N$, where $\tau p$ is a pole pitch and N is an integer greater than or equal to 1, and wherein a relationship between the number of magnetic poles P of the permanent magnets and the number of armature coils M is set to P:M=5:3 for the small-thrust moving part, and a length of the small-thrust moving part is set to $(10/3)\tau p$ by displacing a W-phase coil of the armature coils provided on the small-thrust moving part or on the stator by an electrical angle of 360°.

5. A multihead-type coreless linear motor comprising:

a permanent field magnet having P permanent magnets that are linearly arranged such that different magnetic poles appear alternately; and an armature disposed opposite the permanent field magnet with a magnetic gap therebetween, the armature having M armature coils that are closely wounded and connected in three phases, wherein one of the armature and the permanent field magnet is configured as a moving part and the other is configured as a stator, a plurality of moving parts are arranged on the same stator, and the plurality of moving parts are driven separately relative to the stator, wherein the plurality of moving parts include a large-thrust moving part and a small-thrust moving part that are different in relationship with the stator, the relationship being determined by the number of magnetic poles P of the permanent magnets and the number of armature coils M, wherein a relationship between the number of magnetic poles P of the permanent magnets and the number of armature coils M is set to P:M=5:3 for the large-thrust moving part, and a length of the large-thrust moving part is set to $5\tau p \times N$, where $\tau p$ is a pole pitch and N is an integer greater than or equal to 1, and wherein a relationship between the number of magnetic poles P of the permanent magnets and the number of armature coils M is set to P:M=2:3 for the small-thrust moving part, and a length of the small-thrust moving part is set to $2\tau p$.

6. A multihead-type coreless linear motor comprising:

a permanent field magnet having P permanent magnets that are linearly arranged such that different magnetic poles appear alternately; and an armature disposed opposite the permanent field magnet with a magnetic gap therebetween, the armature having M armature coils that are closely wounded and connected in three phases, wherein one of the armature and the permanent field magnet is configured as a moving part and the other is configured as a stator, a plurality of moving parts are arranged on the same stator, and the plurality of moving parts are driven separately relative to the stator, wherein the plurality of moving parts include a large-thrust moving part and a small-thrust moving part that are different in relationship with the stator, the relationship being determined by the number of magnetic poles P of the permanent magnets and the number of armature coils M, wherein a relationship between the number of magnetic poles P of the permanent magnets and the number of armature coils M is set to P:M=5:3 for the large-thrust moving part, and a length of the large-thrust moving part is set to 5τp×N, where τp is a pole pitch and N is an integer greater than or equal to 1, and wherein a relationship between the number of magnetic poles P of the permanent magnets and the number of armature coils M is set to P:M=2:3 for the small-thrust moving part, and a length of the small-thrust moving part is set to (4/3)τp by displacing a W-phase coil of the armature coils provided on the small-thrust moving part or on the stator by an electrical angle of 180° to reverse the winding direction of the W-phase coil.

7. A multihead-type coreless linear motor comprising:

a permanent field magnet having P permanent magnets that are linearly arranged such that different magnetic poles appear alternately; and an armature disposed opposite the permanent field magnet with a magnetic gap therebetween, the armature having M armature coils that are closely wounded and connected in three phases, wherein one of the armature and the permanent field magnet is configured as a moving part and the other is configured as a stator, a plurality of moving parts are arranged on the same stator, and the plurality of moving parts are driven separately relative to the stator, wherein the plurality of moving parts include a large-thrust moving part and a small-thrust moving part that are different in relationship with the stator, the relationship being determined by the number of magnetic poles P of the permanent magnets and the number of armature coils M, wherein a relationship between the number of magnetic poles P of the permanent magnets and the number of armature coils M is set to P:M=5:3 for the large-thrust moving part, and a length of the large-thrust moving part is set to 5τp×N, where τp is a pole pitch and N is an integer greater than or equal to 1, and wherein a relationship between the number of magnetic poles P of the permanent magnets and the number of armature coils M is set to P:M=4:3 for the small-thrust moving part, and a length of the small-thrust moving part is set to (8/3)τp by displacing a V-phase coil of the armature coils provided on the small-thrust moving part or on the stator by an electrical angle of 360°.

8. The multihead-type coreless linear motor according to claim 1, wherein the ratio of P1 to M1 is set to P1:M1=4:3.

9. The multihead-type coreless linear motor according to claim 8, wherein the ratio of P2 to M2 is set to P2:M2=2:3.

10. The multihead-type coreless linear motor according to claim 8, wherein the ratio of P2 to M2 is set to P2:M2=5:3.

11. The multihead-type coreless linear motor according to claim 1, wherein the ratio of P1 to M1 is set to P1:M1=5:3.

12. The multihead-type coreless linear motor according to claim 11, wherein the ratio of P2 to M2 is set to P2:M2=2:3.

13. The multihead-type coreless linear motor according to claim 11, wherein the ratio of P2 to M2 is set to P2:M2=4:3.

14. The multihead-type coreless linear motor according to claim 1, wherein the first armature coils are linearly arranged in the first direction.

15. The multihead-type coreless linear motor according to claim 1, wherein the second armature coils are linearly arranged in the first direction.

* * * * *